United States Patent
Li et al.

(10) Patent No.: US 6,278,245 B1
(45) Date of Patent: Aug. 21, 2001

(54) BUCK-BOOST FUNCTION TYPE ELECTRONIC BALLAST WITH BUS CAPACITOR CURRENT SENSING

(75) Inventors: Faye Li, Flushing; Eric B. Shen, Scarborough, both of NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/539,507

(22) Filed: Mar. 30, 2000

(51) Int. Cl.[7] .................................................. H05B 37/02
(52) U.S. Cl. ...................... 315/307; 315/224; 315/308; 363/41; 363/98
(58) Field of Search .................................... 315/307, 308, 315/224, DIG. 5, DIG. 7; 363/41, 98

(56) References Cited

U.S. PATENT DOCUMENTS

| 4,626,979 | 12/1986 | JaQuay | 363/41 |
| 5,039,921 | * 8/1991 | Kakitani | 315/307 |

* cited by examiner

Primary Examiner—David Vu
(74) Attorney, Agent, or Firm—Edward W. Goodman

(57) ABSTRACT

An electronic ballast for a high intensity discharge lamp combines the functions of a boost converter and a buck converter and combines the line voltage rectification with the load commutation. With such a configuration, only one controller is required, and the control signal for the controller is taken off a resistor in series with the bus capacitor. As such, the lamp power is indirectly controlled by regulating the input buck current to the buck converter portion, instead of by measuring the lamp current.

5 Claims, 4 Drawing Sheets

BUCK-BOOST FUNCTION TYPE ELECTRONIC BALLAST WITH BUS CAPACITOR CURRENT SENSING

BACKGROUND OF THE INVENTION

1. Field of The Invention

The subject invention relates to electronic ballasts for driving a high intensity discharge lamp, and more particularly, to controlling the output power in such electronic ballasts.

2. Description of The Related Art

It is typical to drive a high intensity discharge (HID) lamp with a low frequency square current waveform. An electronic ballast is used to generate the required drive waveform for the lamp and to provide power factor correction for the utility line. The present state of the art for electronic ballasts is the three-stage topology shown in FIG. 1. This topology consists of a boost converter for power factor correction, a buck converter for regulating lamp power/current, and a commutator for converting the regulated DC voltage into an AC square waveform. In this topology, two controllers are required. One controller is used in the boost converter to regulate the bus voltage, Vbus and to shape the line voltage waveform to follow the input voltage sinusoidal waveform for power factor correction. The other controller is used in the buck converter for regulating the lamp current and power. This topology is well known to those skilled in the art of power electronics. It is simple and straightforward to sense its control variables, because the line voltage is rectified and the sensed parameters can be referenced to the same potential throughout all phases of circuit operation. For example, a simple current sense resistor, R1 placed in series between ground and switch Q2, can be used to monitor the DC lamp current. However, the primary drawbacks for this topology are high parts count and low efficiency due to its multi-stage cascading nature. As shown in FIG. 1, the known three-stage converter ballast includes two controller switches, one for the boost converter and one for the buck converter, as well as four switches Q1–Q4 for controlling the commutation of the high intensity discharge lamp, for a total of six switches.

SUMMARY OF THE INVENTION

It is an object of the invention to provide a combined buck-boost function type electronic ballast in which the parts count is significantly reduced It is a further object of the invention to provide a combined buck-boost function type electronic ballast in which the number of switches is reduced.

It is a still further object of the invention to provide a combined buck-boost function type electronic ballast which exhibits a high efficiency.

These and other objects are achieved in an electronic ballast for high intensity discharge lamps having combined boost and buck converters and a simple current sensing technique, wherein said electronic ballast comprises an AC voltage source having a first terminal and a second terminal; a series arrangement of a first inductance, a second inductance and a high intensity discharge lamp connected to said first terminal of said AC voltage source; a first capacitor arranged in parallel with said high intensity discharge lamp; a first series arrangement of a first high frequency switch having a body diode, and a first low frequency switch arranged in parallel with said second inductance and said high intensity discharge lamp; a second series arrangement of a second high frequency switch also having a body diode, and a. second low frequency switch arranged in parallel with said second inductance and said high intensity discharge lamp, a junction between said second high frequency switch and said second low frequency switch being connected to ground; a series arrangement of two diodes, a cathode of one of said two diodes being connected to a junction of said first high frequency switch and said first low frequency switch, and an anode of the other of said two diodes being connected to the junction of said second high frequency switch and said second low frequency switch, a junction between said two diodes being connected to a second terminal of said AC voltage source; and a series arrangement of a capacitor and a current sensing resistor arranged in parallel with said series arrangement of two diodes, wherein a current through said sensing resistor is used to detect an input buck current of said electronic ballast for indirectly controlling an output power generated by said electronic ballast.

The electronic ballast of the subject invention combines the buck and boost functions and combines the line voltage rectification as well as the load commutation. This circuit arrangement is suitable for driving HID lamps with power requirements less than 200 watts. When the boost converter is running in discontinuous conduction mode (DCM), the AC current waveform will naturally follow the AC voltage waveform without any feedback control. Based on this DCM boost property, the circuit can be rearranged into a form where both the boost converter and the buck converter can share the same active switch. Such an arrangement not only offers reduction in parts count over the conventional approach, but also allows for simplification in control. Only one controller is needed in the electronic ballast of the subject invention. The controller regulates the lamp power by modulating the duty cycle of the high frequency switches. However, if the conventional control philosophy is used in this circuit where lamp power is regulated directly by sensing and controlling the lamp current, then the implementation of sensing the lamp current can be complicated and expensive.

The concept behind the present invention is to control the lamp power indirectly by regulating the input power to the buck converter instead of the conventional lamp current. The buck input current can be easily sensed via a current sense resistor that is strategically placed in series with the bus capacitor. This method works because of two reasons:

(1) The voltage polarity across the bus capacitor is fixed throughout the whole circuit operation; and
(2) There is a unique current flowing pattern through the bus capacitor.

In general, it is not easy to separate the boost and the buck currents flowing in and out of the bus capacitor as in the three-stage topology of the conventional buck-boost converter power supply. However, when the buck and boost functions are combined, the boost current will only flow into the capacitor during the off time of the active switch (the second high frequency switch during the positive half line cycle, and the first high frequency switch during the negative half line cycle), and the buck current will only flow out of the capacitor during the on time of the active switch. Hence, the input current to the buck converter can be easily filtered out by simple circuitry. With this control method, the electronic ballast of the subject invention not only offers a reduction of parts count and an improvement in efficiency in its power stage, but also has a simple resistive current sensing method comparable to the three-stage approach, with the reduction of one controller.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
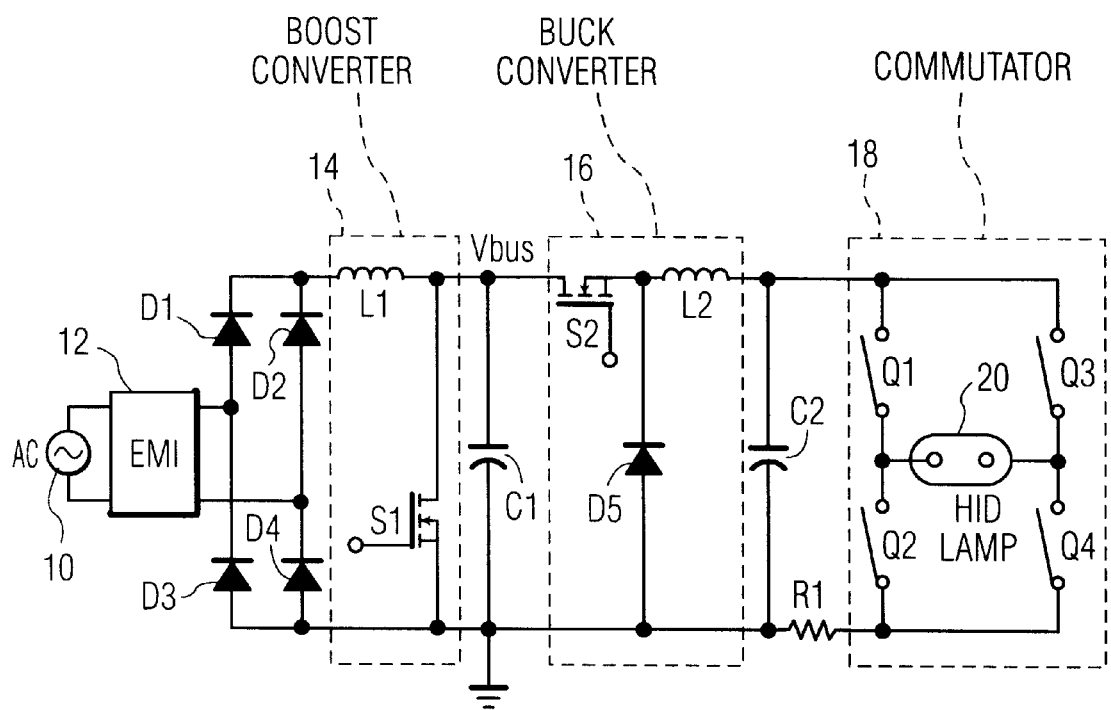
FIG. 1 is a schematic block diagram of a known three-stage converter electronic ballast.

FIG. 1 shows a schematic block diagram of a known three-stage converter electronic ballast. An AC supply voltage 10 is supplied to an electro-magnetic interference (EMI) filter 12 and then is applied across a diode rectifier bridge D1–D4. The output from the diode rectifier bridge is applied to a boost converter 14 which includes the series arrangement of an inductor L1 and a first controller switch S1. The output from the boost converter 14 is taken across the first controller switch S1 and is shunted by a capacitor C1 connected to ground. The voltage across the capacitor C1 is applied to a buck converter 16 which consists of a series arrangement of a second controller switch S2 and a diode D5, with an inductor L2 connected to the junction between the second controller switch 52 and the diode D5. The inductor L2 and the grounded end of the diode D5 form the outputs from the buck converter 16 and are shunted by a capacitor C2. The inductor L2 output from the buck converter 16 is applied directly to a first terminal of a commutator 18 while the grounded output from the buck converter 16 is applied through a resistor R1 to a second terminal of the commutator 18.

The commutator 18 includes, connected to the first and second terminals, the parallel arrangement of two serially-arranged commutator switches Q1/Q2 and Q3/Q4 in which a high intensity discharge lamp 20 is connected between the junctions of the serially-arranged commutator switches.

In this three-stage converter electronic ballast, the output current of the converter is measured across the resistor R1 and the output voltage of the converter is measured across the capacitor C2. These sensed output current and voltage are used to control the first and second controllable switches S1 and S2.

Figure 2:
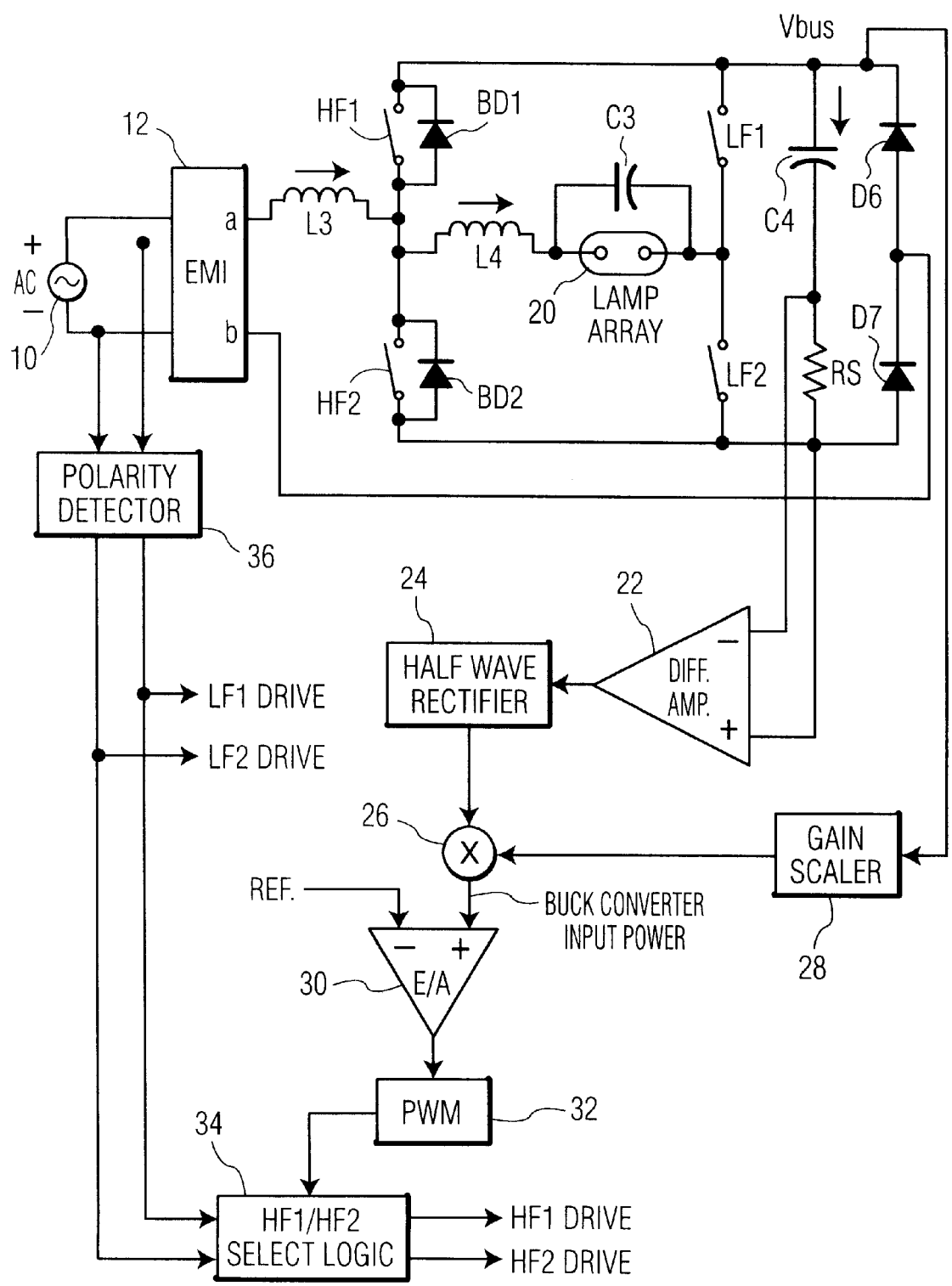
FIG. 2 is a schematic block diagram of the buck-boost function type electronic ballast of the subject invention with an exemplary controller connected thereto.

The buck-boost function type electronic ballast of the subject invention is schematically shown in FIG. 2. In particular, as in the three-stage converter electronic ballast of the prior art, an input AC (line) voltage source 10 applies its output to an electromagnetic interference (EMI) filter 12. One terminal (a) of the EMI filter 12 is applied to the series arrangement of a first inductor L3, a second inductor L4 and an HID lamp 20, the HID lamp 20 being shunted by a capacitor C3. A first series arrangement of a first high frequency switch HF1, along with its body diode BD1, and a first low frequency switch LF1 are arranged in parallel with the second inductor L4 and the HID lamp 20. A second series arrangement of a second high frequency switch HF2, along with its body diode BD2, and a second low frequency switch LF2 is also arranged in parallel with the second inductor L4 and the HID lamp 20, in which the junction between the second high frequency switch HF2 and the second low frequency switch LF2 is connected to ground. The series arrangement of two diodes D6 and D7 connect the junction of the first high frequency switch HF1 and the first low frequency switch LF1 to the junction of the second high frequency switch HF2 and the second low frequency switch LF2. Finally, a series arrangement of a capacitor C4 and a current sensing resistor Rs is arranged in parallel with the series arrangement of the two diodes D6 and D7.

The first and second low frequency switches LF1 and LF2 are synchronized with the input AC voltage source 10. When the AC voltage is positive, the first low frequency switch LF1 is closed, while the second low frequency switch LF2 is open. The second high frequency switch HF2 operates as an active transistor in both the boost and buck functions. The body diode BD1 of the first high frequency switch HF1 acts as a boost diode as well as a buck diode. When the second high frequency switch HF2 is closed, the boost function of the converter transfers energy from the line voltage source to the boost inductor L3. The current path of the boost inductor L3 is confined between the line voltage source 10, L3, the second high frequency switch HF2 and the diode D7. The buck function of the converter delivers energy to the HID lamp 20 and to the buck inductor L4 from the bus capacitor C4 via the second high frequency switch HF2 and the first low frequency switch LF1. When the second high frequency switch is open, the boost function transfers energy stored in the inductor L3 to the bus capacitor C4 via the body diode BD1 of the first high frequency switch HF1. The buck function delivers the energy stored in the inductor L4 during the off cycle of the second high frequency switch HF2 to the HID lamp 20 via the first low frequency switch LF1 and the body diode BD1 of the first high frequency switch HF1.

When the input voltage is negative, the roles of the first and second high frequency switches HF1 and HF2 are reversed. The second low frequency switch LF2 is closed and the first low frequency switch LF1 is open. Similar to the positive case, when the first high frequency switch HF1 is closed, bus capacitor C4 delivers energy to the load and to the buck inductor L4 through the buck function of the converter. When the second high frequency switch HF2 is open, the boost inductor L3 delivers energy to the bus capacitor C4 through the boost function of the converter.

Hence, in both the positive and negative input voltage cases, the positive current of the bus capacitor C4, as shown in FIG. 2, is always contributed by the boost function, while the negative current of the bus capacitor C4 is always contributed by the buck function.

Figure 3A:
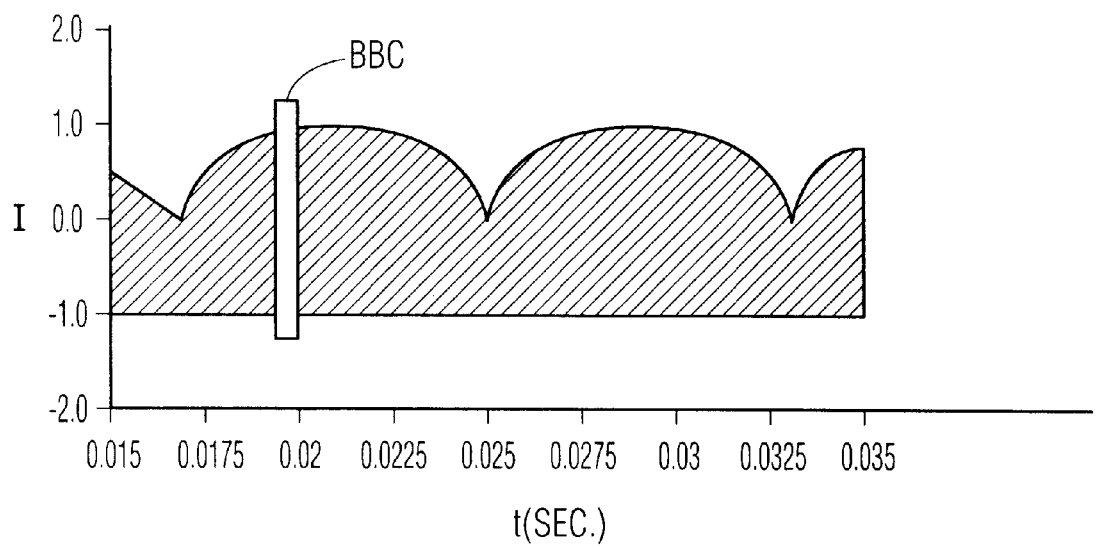
FIGS. 3A and 3B show waveform diagrams of the bus capacitor current.
Figure 3B:
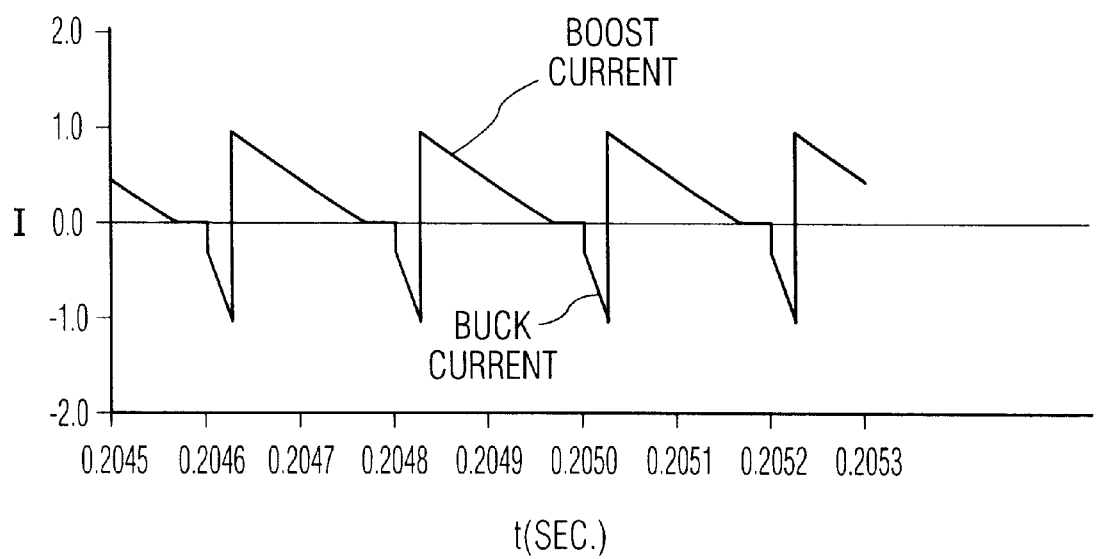

The current waveform of the bus capacitor C4 is shown in FIGS. 3A and 3B. In particular, FIG. 3A shows the overall current waveform over time, while FIG. 3B shows the portion BBC of FIG. 3A in detail. This shows the separation of the buck current and boost currents. This clear separation of the buck and boost currents flowing through the bus capacitor C4 enables the use of a simple resistive current sensing technique to extract input buck current information for lamp power control.

FIG. 2 also shows an example of circuitry for controlling the buck-boost function type electronic ballast of the subject invention. In particular, the voltage across the resistor Rs is applied to a differential amplifier 22 with polarity inversion, which is connected to a half-wave rectifier 24. The output from the half-wave rectifier 24, which is now representative of only the buck current as shown in FIG. 3B, is applied to one input of a multiplier 26. The other input of the multiplier 26 receives the output signal from a gain scaler 29, whose input is connected to the junction between the first high frequency switch HF1 and the first low frequency switch LF1. The output from the multiplier 26, representing the buck converter input power, is applied to one input of an error amplifier 30 which compares this output signal to a reference voltage. The output from the error amplifier 30 is applied to a pulse-width modulator 32, and the modulated signal is applied to a control input of a HF1/HF2 select logic circuit 34. The input line voltage from AC voltage source 10 is applied to a polarity detector 36, the outputs therefrom forming the drive signals for the first and second low frequency switches LF1 and LF2. These outputs are also applied to the HF1/HF2 select logic circuit 34. The outputs from this logic circuit 34 are applied as drive signals for the first and second high frequency switches HF1 and HF2.

Figure 4:
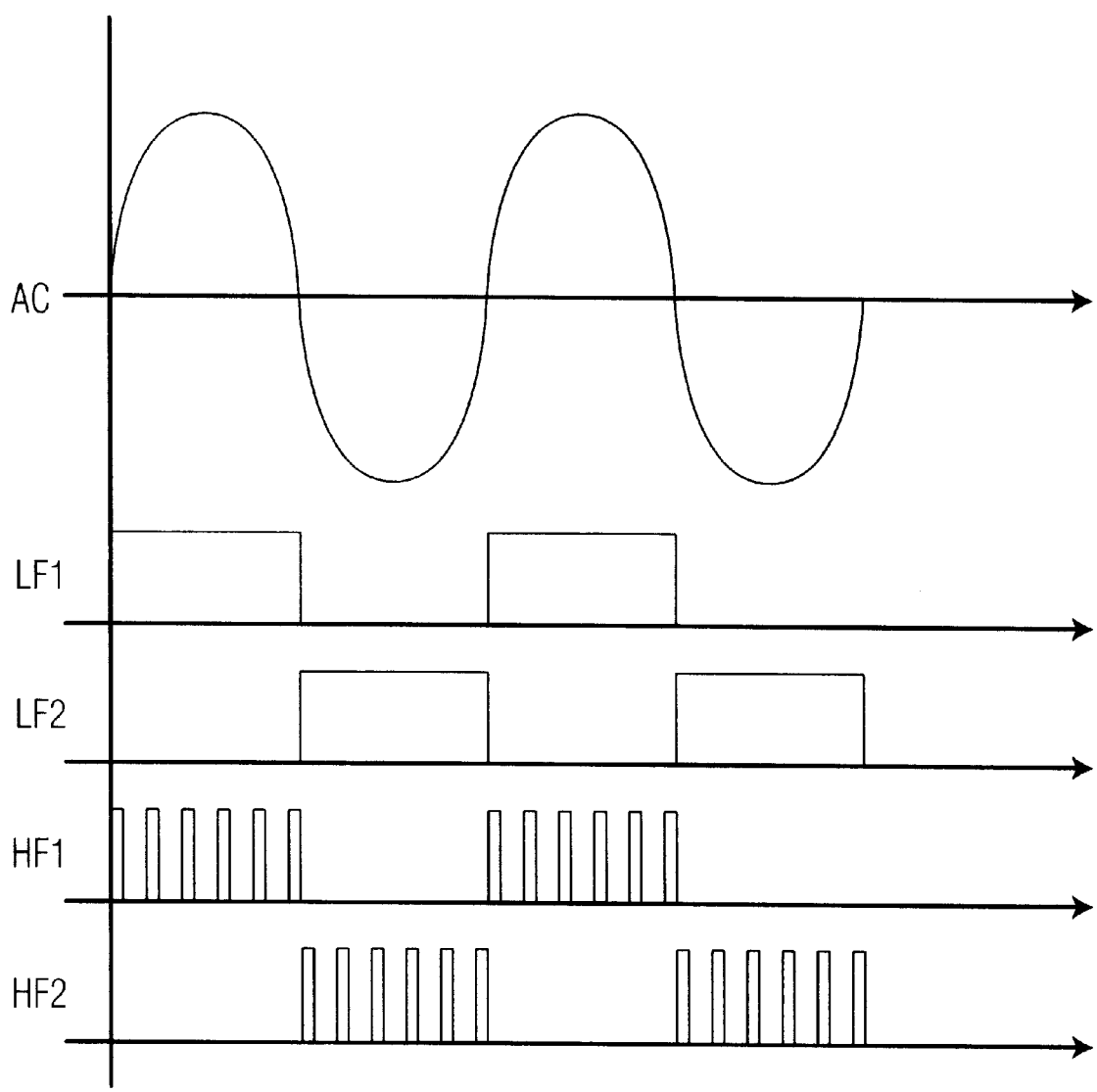
FIG. 4 is a timing diagram showing the switching of the low and high frequency switches in relation to the AC input voltage.

FIG. 4 shows timing diagrams for the switching of the first and second low frequency switches LF1 and LF2, and the first and second high frequency switches HF1 and HF2, in relation to the AC input voltage.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. An electronic ballast for high intensity discharge lamps having combined boost and buck converters and a simple current sensing technique, wherein said electronic ballast comprises:

an AC voltage source having a first terminal and a second terminal;

a series arrangement of a first inductance, a second inductance and a high intensity discharge lamp connected to said first terminal of said AC voltage source;

a first capacitor arranged in parallel with said high intensity discharge lamp;

a first series arrangement of a first high frequency switch, along with a body diode, and a first low frequency switch arranged in parallel with said second inductance and said high intensity discharge lamp;

a second series arrangement of a second high frequency switch, along with a body diode, and a second low frequency switch arranged in parallel with said second inductance and said high intensity discharge lamp, a junction between said second high frequency switch and said second low frequency switch being connected to ground;

a series arrangement of two diodes, a cathode of one of said two diodes being connected to a junction of said first high frequency switch and said first low frequency switch, and an anode of the other of said two diodes being connected to the junction of said second high frequency switch and said second low frequency switch, a junction between said two diodes being connected to a second terminal of said AC voltage source; and a series arrangement of a capacitor and a current sensing resistor arranged in parallel with said series arrangement of two diodes, wherein a current through said sensing resistor is used to detect an input buck current of said electronic ballast for indirectly controlling an output power generated by said electronic ballast.

2. The electronic ballast as claimed in claim 1, wherein the output power of said electronic ballast is controlled by varying the duty cycle of said first and second high frequency switches.

3. The electronic ballast as claimed in claim 1, wherein said electronic ballast includes a controller for controlling said first and second high frequency switches and said first and second low frequency switches.

4. The electronic ballast as claimed in claim 3, wherein said controller comprises:

a polarity detector coupled across said AC voltage source, a first and a second output of said polarity detector forming control signals for said first and second low frequency switches, respectively.

5. The electronic ballast as claimed in claim 4, wherein said controller further comprises:

a differential amplifier coupled to inversely measure a voltage across said sensing resistor;

a half-wave rectifier coupled to an output of said differential amplifier;

a multiplier having a first input coupled to an output of said half-wave rectifier;

a gain scaler coupled to the junction between said first high frequency switch and said first low frequency switch, an output from said gain scaler being coupled to a second input of said multiplier;

an error amplifier having an input coupled to an output of said multiplier, said error amplifier comparing the output from said multiplier with a reference signal;

a pulse-width modulation circuit having an input coupled to an output of said error amplifier; and a select logic circuit for generating high frequency switching signals for said first and second high frequency switches, said select logic circuit having inputs connected to the first and second outputs of said polarity detector, and a control input coupled to an output of said pulse-width modulation circuit, wherein the high frequency switching signals are synchronized to the signals on the first and second outputs of said polarity detector, respectively, and the duty cycles of said switching signals are regulated by the output of said pulse-width modulation circuit.

* * * * *